Feb. 12, 1935.  W. G. WILSON  1,991,006
GATE VALVE
Filed March 19, 1929  3 Sheets-Sheet 1

INVENTOR
Wylie G. Wilson
BY
Frank J. Kent
ATTORNEY

Feb. 12, 1935. W. G. WILSON 1,991,006
GATE VALVE
Filed March 19, 1929   3 Sheets-Sheet 2
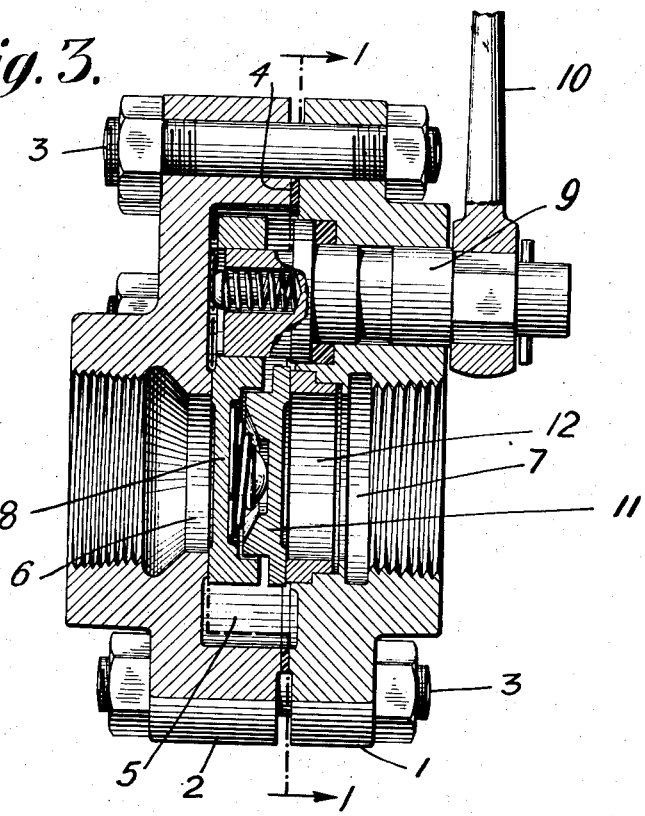
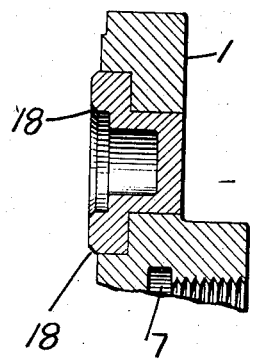
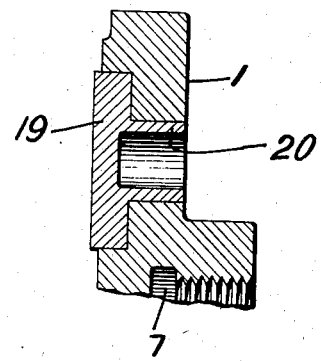
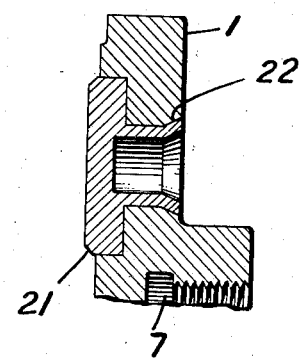

Feb. 12, 1935.  W. G. WILSON  1,991,006
GATE VALVE
Filed March 19, 1929  3 Sheets-Sheet 3

Wylie G. Wilson INVENTOR
BY Frank ——— ATTORNEY

Patented Feb. 12, 1935

1,991,006

UNITED STATES PATENT OFFICE 1,991,006

GATE VALVE

Wylie G. Wilson, Elizabeth, N. J., assignor to Everlasting Valve Company, Jersey City, N. J., a corporation of New Jersey Application March 19, 1929, Serial No. 348,166

4 Claims. (Cl. 251—18)

This invention relates to improvements in gate valves of the type in which an operating member carries a valve member which slides into engagement with a sealing face surrounding the outlet port of the valve.

An object of the invention is to provide the valve casing with a separate member inserted in, and carried by, the interior wall of the valve casing in such a position as to act as a supporting face for the valve member as it moves away from closed position. Additionally or alternately a similar insert may be used to support the operating member in its sliding movement.

A further feature of the invention resides in forming the supporting face for the valve disc separate from, and spaced from the sealing face about the outlet port to provide a dirt trap between these faces. This feature of the invention may be used whether these faces are formed homogeneous with the valve casing or are formed on separate inserts attached to the casing.

The invention also provides a valve structure in which a bushing of material different from the material of the valve casing is secured in a casing port and an insert of material similar to that of the bushing is secured to the inner wall of the casing adjacent the bushing to provide a supporting face. With this arrangement it is convenient to readily replace both bushing and insert when desirable, and it is possible to form the valve casing of ferrous metal to give desired strength while the bushing and insert are formed of corrosion-resisting material.

In the drawings:

Fig. 3 is a section on line 3—3 of Fig. 1.

Figs. 5, 6 and 7 are sectional details of modified supporting plugs.

Figure 1:
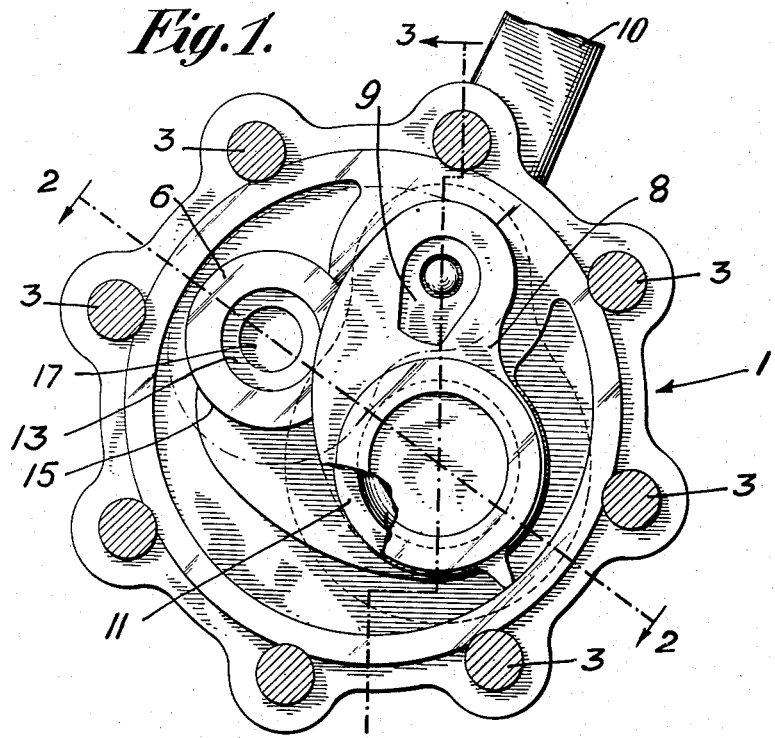
Fig. 1 is a vertical section taken on line 1—1 of Fig. 3 of a valve embodying the invention.

In general, the valve housing consists of a section 1, which is known as the bottom bonnet, and the section 2, which is known as the top bonnet, these bonnets being secured together by bolts 3 and a gasket 4 being interposed between the bonnets. The bonnets are internally recessed to form a chamber 5, and the top bonnet is formed with an inlet port 6, the bottom bonnet being formed with an outlet port 7. These ports are alined with each other and are offset from the center of the valve chamber.

A lever arm 8 has one end keyed to a rotatable shaft 9 in a manner permitting some movement of the arm along the axis of the shaft. The shaft passes through the bottom bonnet and is operated by an external lever 10. In one position of the parts the lever arm 8 extends between the inlet and outlet ports, and a valve disc 11, which is floatingly mounted on lever arm 8, is pressed by constant spring pressure and the pressure of the controlled fluid into sealing contact with a sealing face surrounding the outlet port.

The type of valve that has just been described, is in general use, and its properties and advantages are known to those familiar with the art. In this valve it is very important that the valve disc be supported during the swinging movement of lever arm 8 in such a manner that disc 11 is maintained in perfect alinement with the plane of the sealing face surrounding the outlet port. One reason for the importance of this alinement is that if the valve disc were permitted to tilt a gap would inevitably exist under the valve disc, and grit would inevitably lodge in the gap, preventing close cooperation of the sealing surfaces and possibly scoring one or both of these surfaces.

In order to prevent tilting of the valve disc it has been customary to provide the bottom bonnet with a valve-supporting face formed as a continuation of the sealing face and so shaped as to support the valve disc over the full arc of its swing. A similar supporting face has been provided on the top bonnet to guide and support the rear face of the lever arm 8.

Both of these supporting faces have usually been formed integral and homogeneous with the respective bonnets, and hence have been of the same material as the valve casing. This construction has been satisfactory for many installations, but it has certain limitations. For example, if a given service requires a valve having a body of cast iron or steel for strength, and the valve is in a steam line where it will be operated only at very infrequent intervals, a valve of the known construction above described would not give satisfactory performance. This is because the exposed interior surfaces of the valve casing would corrode during the long period that the valve is in one position, bringing these surfaces below the level of the surfaces that are protected by the valve disc, with the result that the sealing face and the corresponding supporting face are no longer in one plane.

It will be apparent that for service of this character the sealing and supporting faces should be of a corrosion-resisting material, and various attempts have been made to provide a ferrous valve body with sealing and supporting faces of resistant material. The present invention provides a novel and effective means for meeting this situation.

In the species illustrated in Figs. 1 to 4, the valve casing is formed of some strong material such as cast iron or cast steel. A bushing 12 is inserted in the outlet port 7 in such a way that the inner face of the bushing extends above the inner face of the bottom bonnet. The bushing 12 is of suitable material, such as bronze or stainless steel, to resist the corroding effect of the fluid controlled by the valve. The valve-supporting face is formed on a plug 13, which is of a corrosion-resisting material, preferably the same material as that of bushing 12, inserted in the wall of the bottom bonnet at a point spaced from the outlet port but in the path of movement of the valve disc.

Figure 2:
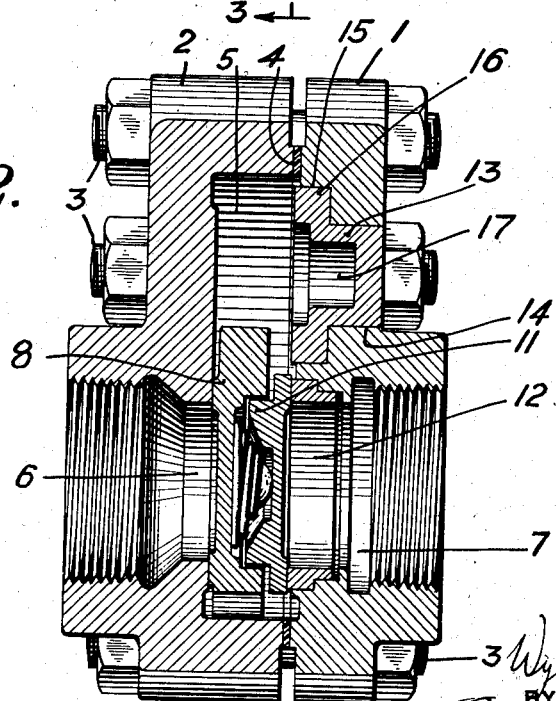
Fig. 2 is a section on line 2—2 of Fig. 1.

Any preferred method may be used for securing the plug 13 to the wall of the bottom bonnet. As shown in Fig. 2, the wall of the bonnet may be bored through to form an opening 14 and then counterbored at 15. The plug 13 engages with a press fit in the bore 14 and carries an enlarged head 16 fitting similarly in the counterbore.

After the bushing 12 and plug 13 have been secured to the bottom bonnet, the ends of the bushing and plug that project from the inner surface of the bonnet are simultaneously machined and thereafter simultaneously ground, so that these surfaces when finished form a sealing face and a valve-supporting face in one true plane.

The plug 13 is so designed and located that the valve disc in sliding from closed to open position is supported at such opposite points on its periphery that there is no tendency for the disc to tilt. The interior of the plug is preferably hollowed out as at 17, so that the walls of the plug are relatively thin, thereby minimizing distortion of the parts if the plug is formed of material having a coefficient of thermal expansion different from that of the material of the valve body.

In this construction the bushing 12 and the plug 13 are separately but rigidly held by the material of a continuous straight wall of the valve casing, and the casing may expand or contract under temperature changes without altering the planar alinement of the sealing face and the valve-supporting face.

If in any particular case it is desired to form corrosion-resisting surfaces on the top bonnet for engagement with the lever arm, a bushing 12 and a plug 13 may be secured to the top bonnet in the manner already described in connection with the bottom bonnet.

The plug carrying the valve-supporting face may be of various shapes and may be secured to the casing in any preferred manner, as by being screwed in, or riveted in, and the bushing around the port can be held in similar ways. Some modifications in the plug structure are illustrated in Figs. 5, 6 and 7. In Fig. 5 the plug has the edges of its supporting face beveled or chamfered as at 18. The plug of Fig. 6 has the enlarged head 19 formed solid and the stem part is bored out at 20. Fig. 7 shows a plug similar to that of Fig. 6, but in this case the edge of the supporting face is chamfered at 21 and the hollow end of the stem is expanded into engagement with a beveled counter-bore 22 to retain the plug in place in the casing.

It should be noted that in the improved valve structure described above it is possible to refinish the sealing and valve-supporting faces whenever necessary, and after these faces have been reduced by successive finishings almost to the level of the casing it is possible to remove and replace the bushing and the plug and restore the valve to new condition so far as these vital wearing parts are concerned. And for this reason the arrangement of parts above described may be advantageously used where the inserts are of the same material as the valve casing, as for instance where both valve casing and inserts are of bronze, and also where the metal of the inserts is selected chiefly because it gives an improved sliding bearing.

Figure 8:
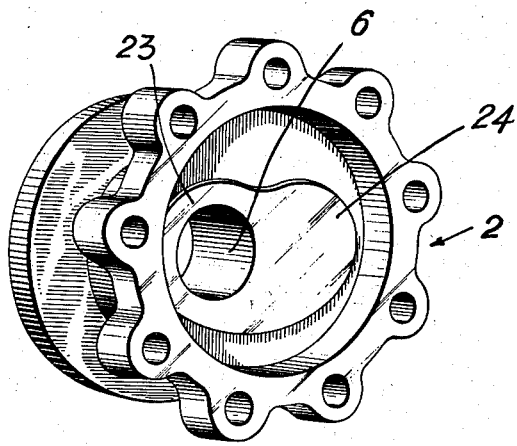
Fig. 8 is a perspective view of the top bonnet of a valve employing a different form of the invention.
Figure 4:
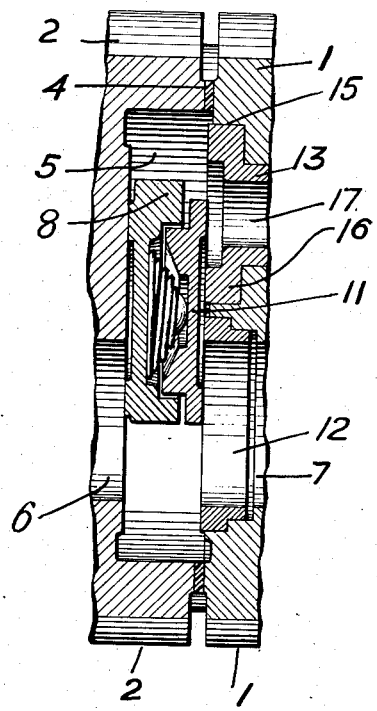
Fig. 4 is a fragmentary section similar to Fig. 3 but showing parts in a different position.
Figure 9:
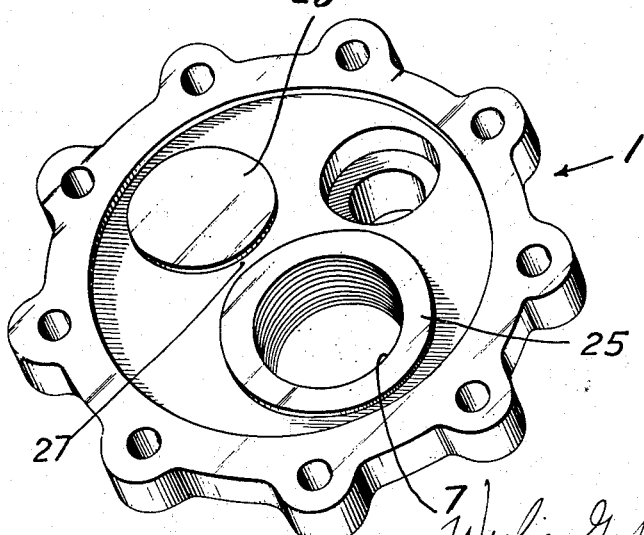
Fig. 9 is a perspective of the bottom bonnet which cooperates with the top bonnet of Fig. 8 to form the valve casing.

It has been found from experiment that the construction of this invention in which the valve-supporting face is separated from the sealing face has certain advantages even when these faces are formed homogeneous with the valve casing. Such a valve is illustrated in Figs. 8 and 9. Fig. 8 shows the interior of the top bonnet 2, with the supporting face 23 surrounding the inlet port 6 and the off-set supporting face 24, both formed homogeneous with the bonnet. Here the raised sealing face 25 which surrounds the outlet port 7 and the raised valve-supporting face 26 are formed homogeneous with the bottom bonnet, but these two faces are separated by a groove 27. The adjacent edges of the faces diverge from each other so that the groove is narrow directly between the faces but flares outwardly toward its ends. Figs. 1 and 2 make it clear that this groove between the sealing face and the supporting face is also present where these faces are formed on members separate from the valve casing.

When the valve is in use grit may become deposited on the sealing and supporting faces, and if the valve disc is moved it may ride up over the grit. But when the groove 27 is present, the grit will drop into the groove as the leading edge of the disc crosses the groove, and the grit will eventually work out through the outwardly-flaring ends of the groove. In this way the sealing faces are protected against scoring and separation due to the presence of grit under the valve disc.

I claim:

1. A valve structure comprising a casing having a bore formed therethrough, a plug of material different from that of the casing, the plug having a hollow stud extending through the bore and expanded into gripping contact with the wall of the casing, the plug being formed with a valve-supporting face.

2. A valve structure comprising a casing having a bore formed therethrough, the inner wall of the casing being formed with a counterbore at the inner end of the bore, the outer end of the bore being enlarged to form a locking recess, a plug of material different from that of the casing, the plug having a head fitting in the counterbore and a hollow stud fitting in the bore, the open end of the stud being expanded into the locking recess to secure the plug in the casing, and the head of the plug being formed with a valve-supporting face.

3. A valve comprising a casing formed with a port, a raised sealing face surrounding the port, a raised valve-supporting face formed in the plane of the sealing face but separated from the sealing face and free from any portions projecting above said plane, the said faces being so formed that the edge of one face diverges from the edge of the other to form a depressed dirt trap between the two faces, and a valve member having a sealing surface and movable from a closed position in which it engages the sealing face to close the port, to an open position in which it is supported partly by the sealing face and partly by the supporting face, the parts being so arranged that the sealing surface of the valve member remains at all times while moving from closed to open position in said plane and in surface contact with said sealing face surrounding the port.

4. A valve comprising a casing formed with a port, a raised sealing face surrounding the port, a raised valve-supporting face formed in the plane of the sealing face but separated from the sealing face and free from any portions projecting above said plane, the said faces being so formed that at points adjacent to a line connecting the center of the sealing face with the center of the valve-supporting face the edge of the sealing face is closer to the edge of the valve-supporting face than at any other point on its periphery to form an X-shaped dirt trap between the two faces, and a valve member having a sealing surface and movable from a closed position in which it engages the sealing face to close the port, to an open position in which it is supported partly by the sealing face and partly by the supporting face, the parts being so arranged that the sealing surface of the valve member remains at all times while moving from closed to open position in said plane and in surface contact with said sealing face surrounding the port.

WYLIE G. WILSON.